US006779183B1

(12) United States Patent
Chekuri et al.

(10) Patent No.: US 6,779,183 B1
(45) Date of Patent: Aug. 17, 2004

(54) METHOD AND SYSTEM FOR LOAD SCHEDULING MULTIDIMENSIONAL TASKS AMONG MULTIPLE PROCESSORS

(75) Inventors: Chandra Chekuri, Highland Park, NJ (US); Sanjeev Khanna, Philadelphia, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/471,873

(22) Filed: Dec. 23, 1999

(51) Int. Cl.[7] .................................................. G06F 9/46

(52) U.S. Cl. ....................... 718/105; 718/102; 718/103; 718/104

(58) Field of Search ................................ 709/102, 103, 709/104, 105; 718/102, 103, 104, 105

(56) References Cited

U.S. PATENT DOCUMENTS 4,495,559 A 1/1985 Gelatt, Jr. et al.
5,016,503 A * 5/1991 Morton ........................ 81/127
5,175,692 A 12/1992 Mazouz et al.
5,493,633 A 2/1996 Obata
5,617,514 A 4/1997 Dolby et al.
5,742,821 A 4/1998 Prasanna
5,768,594 A 6/1998 Blelloch et al.
5,889,989 A * 3/1999 Robertazzi et al. ......... 718/105
6,340,560 B1 * 1/2002 Inaba et al. ................. 430/455

OTHER PUBLICATIONS

Chandra Chekuri, Sanjeev Khanna. On multi–dimensional packing problems. Proceedings of the 10$^{th}$ annual ACM–SIAM symposium on Discrete algorithms. Jan. 1999.*

"Using Dual Approximation Algorithms for Scheduling Problems: Theoretical and Practical Results", Dorit S. Hochbaum, *Journal of the Association for Computing Machinery*, vol. 34, No. 1, Jan. 1987, pp. 144–162.

"A Polynomial Approximation Scheme for Scheduling on Uniform Processors: Using the Dual Approximation Approach", Dorit S. Hochbaum and David B. Shmoys, *SIAM J. Comput.*, vol. 17, No. 3, Jun. 1988.

"Multi–Dimensional Resource Scheduling for Parallel Queries", Minos N. Garofalakis & Yannis E. Ioannidis, *In Proc. of the 1996 ACM SIGMOD Int'l Conf. on Management of Data*, Montreal, Calada, Jun. 1996.

* cited by examiner

*Primary Examiner*—Anil Khatri
*Assistant Examiner*—Thomas Pham

(57) ABSTRACT

In accordance with the principles of the invention, a method and system of multiprocessor scheduling for load sharing among multiple multiprocessors to within any given error criteria, ε>0, is disclosed. The method comprises guessing a value for an optimal load on the processors, partitioning a plurality of multi-dimensional tasks into a set of large tasks and a set of small tasks, guessing the invention of the set of small tasks and among the set of larger tasks processors which are represented as multi-dimensional bins, packing a discretized the set of large tasks, in the guessed invention space of the multi-dimensional bins determining if the small tasks can be allocated into unallocated space of the multi-dimensional bins after packing of the discretized large tasks, and iteratively repeating the guessing steps until all the tasks can be allocated within the gussed load. The method establishes a schedule of the multi-dimensional tasks which provides a maximum load among the multi-processors which is less than (1+ε) times the optimal load.

15 Claims, 3 Drawing Sheets

10
11
GUESS OPTIMAL VALUE OF LOAD AMONG MACHINES 12
CLASSIFYING TASKS AS LARGE OR SMALL 14
GUESS INTERACTION OF LARGE AND SMALL TASKS AMONG MACHINES 16
DETERMINING PACKING OF LARGE TASKS 18
20 DETERMINE IF SMALL TASKS CAN BE ALLOCATED IN GUESSED INTERACTION? YES NO
22 DETERMINE IF ANOTHER GUESS CAN BE MADE FOR INTERACTION OF LARGE AND SMALL? YES NO
VECTOR SCHEDULE PROVIDES APPROXIMATE VALUE WITHIN (1+ε) OF OPTIMAL 24

METHOD AND SYSTEM FOR LOAD SCHEDULING MULTIDIMENSIONAL TASKS AMONG MULTIPLE PROCESSORS

BACKGROUND OF THE INVENTION

1. Field of the Invention

The invention relates to multiprocessors, and more particularly, to scheduling multidimensional tasks on multiple processors.

2. Description of the Related Art

The classical multiprocessor scheduling problem is to allocate a set of independent tasks on a collection of processors which may operate at different speeds, such that the entire set of tasks is completed in the least amount of time. The approximate processing time of each task is known. Typically, the number of tasks to be scheduled is larger than the number of available processors and thus multiple tasks may be assigned to each processor. The objective is to find a schedule for assigning tasks to the processors that minimizes the maximum time that any machine is scheduled.

Multiprocessor scheduling is a Nondeterministic Polynomial Time hard (NP-hard) optimization problem. No efficient solution method is known for NP hard problems and for known solution methods the execution time required to solve an instance of the problem is exponential in the number of given tasks. It is thus computationally intractable to compute exact or optimal solutions for large instances. A widely used approach to overcome this barrier is to settle for sub-optimal solutions. Approximation algorithms have been used to provide approximate solutions to scheduling problems which are NP-hard. A polynomial time approximation algorithm produces a solution of objective value which is at most $(1+\epsilon)$ times the optimal value for some $\epsilon>0$, wherein $\epsilon$ is the relative error. The running time of the algorithm is polynomial in the size of the input instance and hence they are efficient. Such an algorithm is referred to as a $(1+\epsilon)$-approximation algorithm. A problem is said to have a polynomial time approximation scheme (PTAS) if for any fixed $\epsilon>0$, there exists a polynomial time $(1+\epsilon)$ approximation algorithm. Thus an arbitrary good approximation can be achieved in polynomial time for a problem with a PTAS.

When each given task is one-dimensional, a PTAS scheme is known for the multiprocessor scheduling problem. It is described in Hochbaum et al., "Using Dual Approximation Algorithms for Scheduling Problems: Theoretical and Practical Results.", Journal of the Association for Computing Machinery, Vol. 34, No. 1, January 1987, pp. 144–162 hereby incorporated by reference. The PTAS uses a dual approximation algorithm in which the scheduling problem is viewed as a bin packing problem. In the bin packing problem we are given a set of items (jobs) of size at most 1 and the goal is to assign them to a given number of bins (processors) of height (load) 1 such that all items are assigned to bins without exceeding the height of 1. A feasible solution for the bin packing problem is an assignment which satisfies the above mentioned properties.

Hochbaum et al. describe a polynomial time algorithm which given a feasible bin packing instance finds a feasible solution for the same problem but with the bin height relaxed to $(1+\epsilon)$. This algorithm works for any fixed $\epsilon$. The algorithm classifies jobs into large or small depending on whether the size of the job is greater than $\epsilon$ or not. Only a fixed number of large jobs (at most $1/\epsilon$) can be packed into any of the m bins, wherein m represents the number of given bins. The sizes of the large jobs are discretized into $O(\log 1/\epsilon)$ classes and dynamic programming is used to pack all large jobs into the m bins such that no bin exceeds a height of $(1+\epsilon)$. Small jobs are packed on top of the packed large jobs in a greedy fashion. The Hochbaum et al. algorithm works only when the dimension of all jobs is one.

Other conventional techniques for multiprocessor scheduling include using optimal control theory to model tasks and the processing power applied to each task in graphs and hypergraphs. Scheduling algorithms are applied to graphs derived from an original task graph by conventional task expansion techniques. U.S. Pat. No. 5,742,821 discloses a multiprocessor scheduling and execution method in which a set of flow conservation equations and timing constraints are determined for signal processing tasks. Corrected gradient descents are performed using the determined flow conservation equations, timing constraints and an error criteria until substantial convergence to a processor schedule occurs. The signal processing tasks are defined as one dimensional and are executed according to the determined processor schedule.

Multiprocessor scheduling problems become more complex when multi-dimensional tasks are scheduled. A multi-dimensional task executes on a processor with a number of system resources that are time shareable, such as for example a central processing unit (CPU), one or more disks, and network controllers. One conventional type of multi-dimensional task is a database query in parallel database systems. See, Garofalakis et al., "Multi-dimensional Resource Scheduling For Parallel Queries.", in the Proceedings of the 1996 ACM SIGMOD International Conference on Management Data, Montreal Canada, June 1996, pp. 365–376, hereby incorporated by reference. A need exists for a method for scheduling the execution of multi-dimensional tasks on a plurality of multiprocessor in order to minimize the maximum load on any dimension of the multiprocessor.

SUMMARY OF THE INVENTION

The invention is directed to a method and system of multiprocessor scheduling of multi-dimensional tasks for load sharing among multiprocessors to within any given error criteria, $\epsilon>0$. The method comprises guessing the optimal load on the processors, partitioning the set of multi-dimensional tasks to be scheduled into a set of large tasks and a set of small tasks, guessing the interaction of the set of small tasks and the set of large tasks among the processors which are represented as multi-dimensional bins, packing a discretized set of large tasks in the guessed interaction, determining if the small tasks can be allocated into unallocated space of the multi-dimensional bins after packing of the discretized large tasks, and iteratively repeating the guessing steps until all the tasks can be allocated within the guessed load. The method establishes a schedule of the multi-dimensional tasks from the bin configuration of the set of discretized large tasks and the bin configuration of the set of small tasks. The established schedule provides an approximate value of the maximum load among the multiprocessors which is less than $(1+\epsilon)$ times the optimal load. For a pre-selected number of different resources accessed by the multi-dimensional tasks and error criteria, the method provides a schedule having polynomial time for the number of tasks and the number of multiprocessors. For a fixed number of different resources used by the multi-dimensional tasks and a fixed relative error target $\epsilon$, the method provides a schedule with the above mentioned guarantee in time polynomial in the number of tasks and number of multiprocessors.

Other features of the invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

During the course of this description, like numbers will be used to identify like elements according to the different figures which illustrate the invention.

Figure 1:
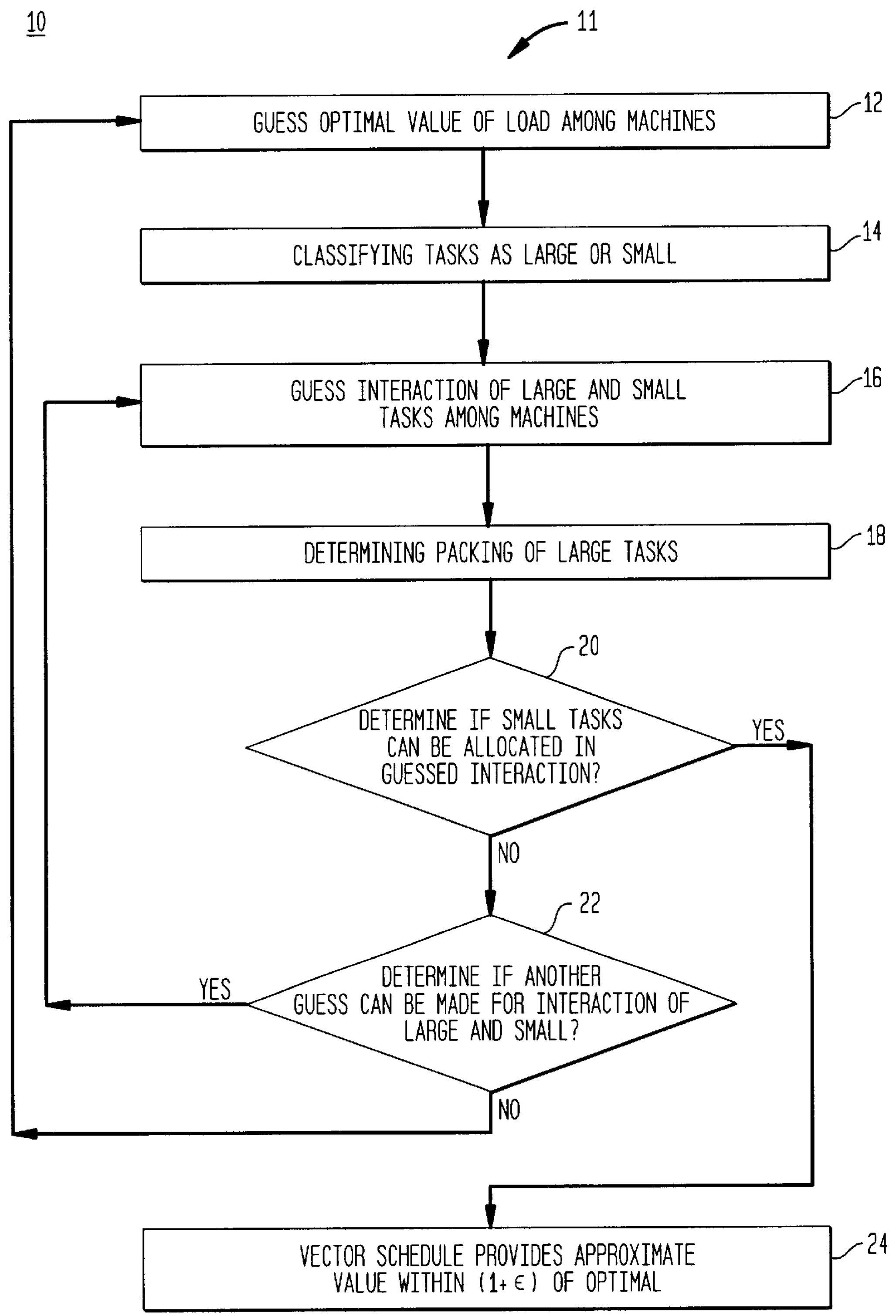
FIG. 1 is a flow diagram of a method of load sharing multi-dimensional jobs among multiple processors in accordance with the present invention.

FIG. 1 illustrates a flow diagram of a method of scheduling multi-dimensional tasks on a multiprocessor 10. The multiprocessor can be for example digital signal processors (DSP's), microprocessors within a single computer or multiple individual computers linked together over a network. A d-dimensional multiprocessor refers to processors having a set of d time shareable resources, such as for example a CPU, one or more direct access storage devices (DASD), a network controller or a modem. Load of the d-dimensional multiprocessor refers to the minimum time required for the processors to finish all assigned d-dimensional tasks. For example, the load of the d-dimensional multiprocessor can be a combination of the CPU load, the disk load, the network controller load and the modem load. The method provides an approximate value within $(1+\epsilon)$ of the minimum load required for the given instance of the multi-processor scheduling problem. A d-dimensional vector can be used to represent each multi-dimensional task. The components of the d-dimensional vector represent the amount of resources required by the task from each of the d system resources and can be derived or estimated from system parameters. A d-dimensional bin can be used to represent each processor or machine. The method of the present invention provides an approximate solution for scheduling on the multiprocessors by allocating or packing a plurality of d-dimensional vectors into d-dimensional bins in order to minimize a load vector across all of the d-dimensional bins. A vector schedule length for each of the d-dimensional bins is represented as the allocated height of the respective bin.

Input 11 comprises a set J of n d-dimensional vectors represented by $p_1, \ldots p_n$ from $[0, \infty]^d$ wherein d is the number of dimensions or resources required by each task and n is the number of tasks. Input 11 also comprises a number of machines represented by a number m and an error criteria represented by $\epsilon$. In accordance with the teachings of the present invention, the number of dimensions, d, is assumed to be a fixed constant$\geqq 2$. The error criteria, $\epsilon$, is pre-selected as having a value greater than zero but less than 1.

In block 12, an initial guess, G', of an optimal value of the load among machines is determined. By normalizing the load vectors it is assumed without loss of generality that the optimal load has a value of one. By the definition of the load of the system there is a feasible solution that assigns the given d dimensional vectors (tasks) to the given number m of d-dimensional bins such that the height of each bin is at most one. In block 14, multidimensional tasks are classified as large or small. A task is classified as a small task if its largest dimension is $\leqq \epsilon/d$ otherwise if the largest dimension is $>\epsilon/d$ the task is classified as a large task. L and S will be used to denote the set of large tasks and small tasks (vectors) respectively.

Figure 2:
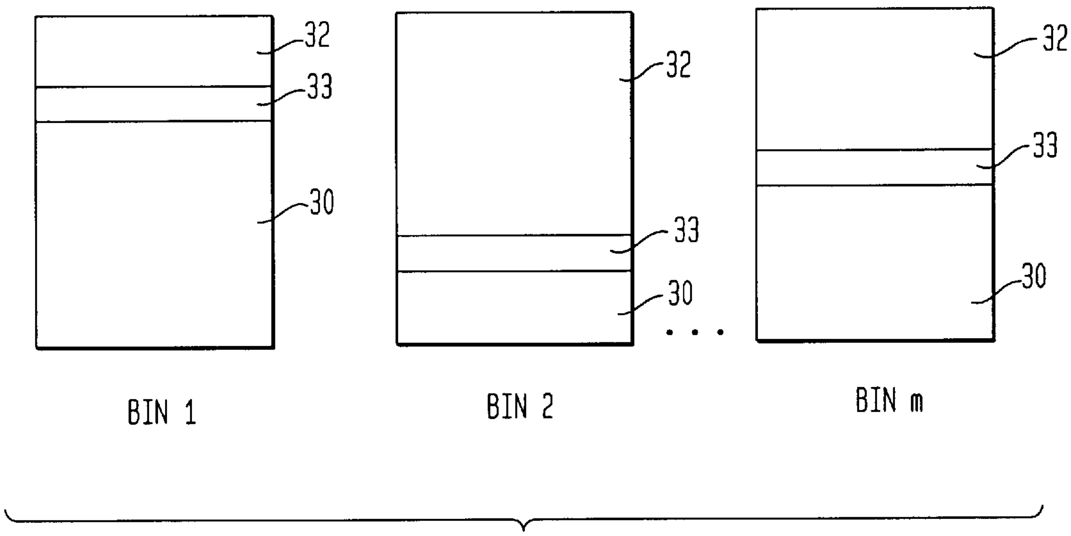
FIG. 2 is a block diagram of a method for allocation of a set of small tasks into d-dimensional bins.

A representation of an allocation of a set L of large vectors into m d-dimensional bins to provide a bin profile is shown in FIG. 2. In this example, allocated space 30 is the space allocated to the set L of large vectors which represents the vector schedule for the set L of large vectors. Unallocated space 32 is the space above allocated space 30 to the maximum height of the bin. It will be appreciated that unallocated space of m d-dimensional bins relates to unallocated resources of d-dimensional multiprocessors and the allocated and unallocated space alternatively could be represented at any position in each of the m d-dimensional bins. Unallocated space 32 can be used for packing the set S of small vectors.

In block 16, an interaction is guessed between small tasks and large tasks for determining optimal configuration of the bins. An optimal configuration of bins specifies available space for the large tasks in each bin and available space for the small tasks in each bin The space allocated for large tasks in each dimension of each bin of the guessed configuration is smoothed by a value of $\epsilon$ for each bin as represented by space 33, as shown in FIG. 2. Thus, the space allocated is rounded up to the nearest integer multiplier of $\epsilon$. Accordingly, the space allocated for large tasks in each dimension of each bin can be represented by an integer between 0 and $1/\epsilon$. Since each bin is d dimensional the number of distinct ways of allocating space for large tasks in each bin is at most $t=(1/\epsilon+1)^d$ and each bin is one of the t-types. Accordingly, one can specify the configuration of all the bins by specifying the number of bins of each of the t-types and therefore there are $m^t$ guesses to try in block 16.

Referring to FIG. 1 in block 18, packing of large tasks in the d-dimensional bins is determined. To accomplish this the set L of large vectors is transformed into a set L' of discretized vectors such that the number of distinct vectors in L' is small, as described in detail below. Thereafter, a set L' of discretized large vectors is packed into the space of m d-dimensional bins using dynamic programming taking advantage of the small number of distinct vectors.

In block 20, it is determined whether the small tasks represented by the set S of small vectors can actually be packed in the space remaining after packing of the set L' of discretized large vectors according to the guessed interaction. A vector schedule of the set S of small vectors and the set L of large vectors is established if it is determined that set S of small vectors can be packed after packing set L' of discretized large vectors without exceeding the d-dimensional bin height $1+\epsilon$, in block 24. Accordingly, the determined vector schedule provides an approximation value of no more than $(1+\epsilon)\times G'$, wherein G' is the guessed optimum value of the load.

Alternatively, if it is determined that set S of small vectors cannot be packed in the space remaining after packing of the set L of discretized large vectors then blocks 16, 18, 20 and 22 are iteratively executed with different guesses of the interaction of large tasks and small tasks. Thereafter, the initial guess, G', can be increased by a factor of (1+$\epsilon$) during each subsequent iteration of blocks 12–22. The maximum number of iterations of block 12–22 is log (n d)/$\epsilon$ and for fixed $\epsilon$ and d the iterations of block 12–22 are completed in polynomial time.

The interaction between the packing of large and small vectors into the d-dimensional bins can be further explained by the following example. A capacity configuration approximately describes how a d-dimensional bin is filled. A capacity configuration is represented by a d-tuple of ($a_1, a_2, \ldots, a_d$) such that $0 \leqq a_i \leqq \lceil 1/\epsilon \rceil$. A maximum number of capacity configurations is represented by the equation:

$$t=(1+\lceil 1/\epsilon \rceil)^d$$

A bin configuration for m bins describes the number of bins of each capacity configuration. Accordingly, the bin configuration can be represented by t-tuple ($m_1, \ldots, m_t$) wherein $0 \leqq m_i \leqq m$ and $\Sigma_i m_i = m$. The number of possible bin configurations is then $O(m^t)$. Therefore there are only a polynomial number of possible bin configurations for fixed d and $\epsilon$. Thus, a "guess" of the bin configuration can be used for determining a feasible packing. The packing of vectors in a bin respects a bin configuration ($a_1, \ldots, a_d$) if the height of the packing in each dimension i is less than $\epsilon a_i$. The corresponding empty capacity configuration is defined as the tuple obtained by subtracting each entry from ($\lceil 1/\epsilon \rceil$+1). For a bin configuration, M, the corresponding bin configuration, $\overline{M}$, is obtained by taking empty capacity configurations for each of the bins in M. The M bin configuration and $\overline{M}$ corresponding bin configuration are suitable if vectors in set L of large vectors can be packed in the bin configuration, M, and vectors in set S of small vectors can be packed in the corresponding bin configuration, $\overline{M}$, without exceeding the bin maximum height of 1+$\epsilon$.

Figure 3:
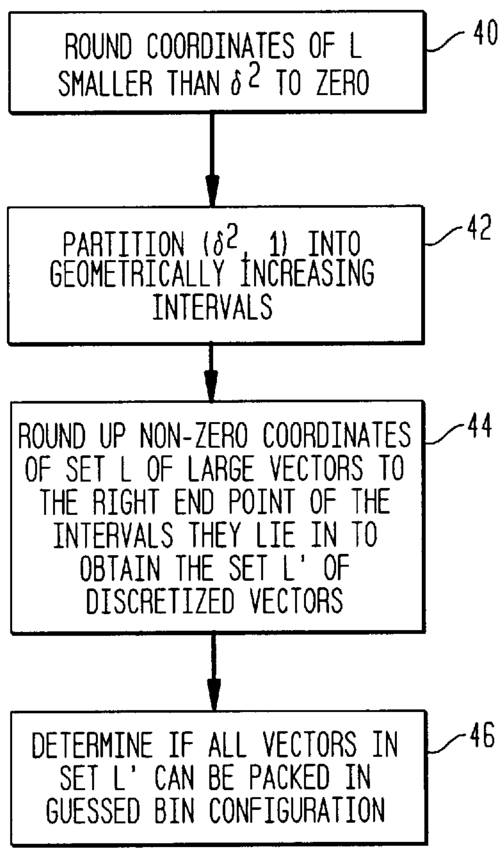
FIG. 3 is a flow diagram of a method of allocating large tasks into the d-dimensional bins.

FIG. 3 illustrates a flow diagram of a method for performing block 18 to determine packing of large tasks in which the set L of large vectors is discretized into a set L' of discretized large vectors. An error criteria per dimension is represented by $\delta=\epsilon/d$. Each vector of L is transformed as follows. In block 40 any dimension of the vectors smaller than $\delta^2$ is rounded down to zero. Therefore the smallest non zero coordinate of the set L of large vectors is at least $\delta^2$ after this step. In block 42 the interval [$\delta^2$, 1] is partioned into $\lceil \log_{1+\epsilon} 1/\delta^2 \rceil$ intervals which have the form:

$$[\delta^2, (1+\epsilon)\delta^2], \ldots [(1+\epsilon)^i\delta^i, \ldots (1+\epsilon)^{i+1}\delta^2], \ldots [, 1].$$

In block 44, every non zero coordinate of set L of large vectors is discretized by mapping the coordinate up to the right end part of the interval in which the coordinate falls. For example, every coordinate that falls in the interval of:

$$[(1+\epsilon)^i\delta^2, (1+\epsilon)^{i+1}\delta^2]$$

is mapped to:

$$(1+\epsilon)^{i+1}\delta^2.$$

From blocks 40–44, every coordinate in set L' of discretized large vectors has $\lceil \log_{1+\epsilon} 1/\delta^2 \rceil$ possible values resulting in at most $(\log_{1+\epsilon} 1/\delta^2)^d$ different types of vectors in set L' of discretized large vectors. It will be appreciated that reducing the number of different types of vectors in set L of large vectors by discretization reduces the computational burden of packing of set L of large vectors in m d-dimensional bins.

In block 46, it is determined if all vectors in the set L' of discretized large vectors can be packed in the guessed bin configuration. It is observed that at most d/$\delta$ vectors in the set L' of discretized large vectors can fit in any of the m d-dimensional bins. Also, there is a fixed number of different types of vectors which can be classified as $s=(\log d/\epsilon)^d$, such that for fixed $\epsilon$ and d, the number of discretized large tasks in any bin is $d^2/\epsilon$. Accordingly, any subset of vectors from the set L' of discretized large vectors can be specified by a tuple of size s and there are $O(n^s)$ distinct tuples, wherein n is the total number of tasks.

Dynamic programming can be used to determine all possible subsets of the set L' of discretized large vectors that can be packed in the m d-dimensional bins. The m d-dimensional bins are ordered in some arbitrary way. Each d-dimensional bin is assigned a capacity configuration from M. All possible subsets of vectors are determined from the set L' of discretized large vectors (tuples) for $1 \leqq i \leqq m$ that can be packed in the first i bins. It will be appreciated that for each i this information can be maintained in $O(n^s)$ space. Given the tuples for bin i, the tuples for bin (i+1) can be determined in $O(d/\delta)^s$ time per tuple as an upper bound on the number of feasible configurations for any capacity configuration. Thus, for each bin i, in the tuples that can be packed into the first i bins can be determined given the information for bin (i−1), $O((d/\delta)^s n^s)$ time. Accordingly, for m d-dimensional bins the maximum execution time for iterating blocks 12–22 is $O((d/\delta)^s mn^s)$ such that for fixed d and an error criteria, $\epsilon$, a vector schedule providing an approximation value within (1+$\epsilon$) of the optimal for each of the d-dimensional bins can be determined that is polynomial time in n and m.

Figure 4:
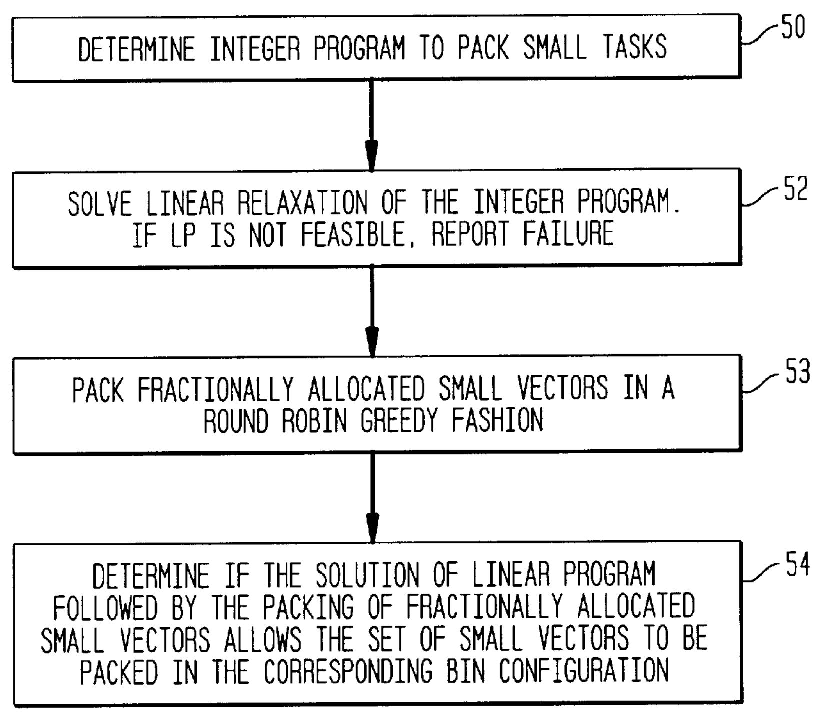
FIG. 4 is a flow diagram of a method of allocating small tasks into the d-dimensional bins after packing of the large tasks.

FIG. 4 illustrates a flow diagram of a method for performing block 22 to determine if the set S of small vectors can be packed in accordance with the packing of the set L' of discretized large vectors. The set of small tasks is represented by $\{J_1, J_2 \ldots J_l\}$ In block 50, an integer program (IP) is used to determine packing of small tasks. The vectors in set S of small vectors are numbered 1 to l. The integer program formulation has 0–1 variables $q_{ij}$ for $1 \leqq i \leqq l$ and $1 \leqq j \leqq m$. Variable $q_{ij}$ is 1 if $p_i$ is assigned to machine j. Every vector of the set S of small vectors must be allocated to some m bin resulting in the following equation:

$$\sum_{j=1}^{m} q_{ij} = 1 \tag{1}$$

Given a bin configuration M, a height bound $b_j^k$ can be defined for each multiprocessor j in dimension k that an assignment of a small vector should satisfy. A constraint of space can be represented by the following:

$$\sum_i p_i^k \cdot q_{ij} \le b_j^k \text{ for } 1 \le j \le m, \quad 1 \le k \le d. \tag{2}$$

such that tasks assigned to a machine do not exceed capacity. Integrality constraints can be defined as, $q_{ij} \in \{0,1\}$.

In block 52, linear relaxation can be used to solve the integral program in polynomial time. A linear program (LP) can be obtained by replacing the integrality constraints by the following:

$$q_{ij} \geqq 0 \tag{3}$$

A basic feasible solution to the linear program (LP) defined by Equations 1, 2, and 3 can be obtained by conventional techniques. If there is no feasible solution for the linear program, a failure is returned since there is no way to pack the small jobs in the given space. This will result in trying a new guess for the interaction between large and small jobs in block 22 of FIG. 1. The number of positive variables in a basic feasible solution is less than or equal to the number of constraints in LP formulation. Accordingly, the number of positive $q_{ij}$ is $$\leqq l+m\cdot d$$

A fractionally allocated small vector is a vector for which it cannot be determined which of m bins the vector should be assigned, in other words the solution to the LP assigns the vector to more than one bin in fractional amounts strictly less than one. Let $\alpha$ be the number of jobs assigned fractionally. Each fractionally assigned task uses up at least two positive $q_{ij}$ variables resulting in $$(l-\alpha)+2\alpha\leqq l+m\cdot d$$

$$\text{and } \alpha\leqq m\cdot d$$

Accordingly, in a basic feasible solution to the above LP at most m·d small vectors in set S of small vectors are allocated fractionally and all other small vectors in set S of small vectors are allocated integrally to one of the m bins. In block 53, fractionally allocated small vectors are assigned in a round robin fashion to each of m bins such that there are no more than d fractionally allocated small vectors assigned to each bin. The allocation increases the bin height of any machine by $$d\times\epsilon/d\leqq\epsilon$$

Accordingly, the above assignment of fractionally allocated small vectors does not effect the height of each bin by more than error criteria, $\epsilon$. In block 54, it is determined whether the solution to the linear program followed by the round robin allocation of fractionally assigned jobs allows the set of S small vectors to be packed in the $\overline{M}$ bin configuration.

In combination, method 10 provides a $(1+3\epsilon)$ approximation from an $\epsilon$ error in discretizing the interaction, an $\epsilon$ error in discretizing large tasks and $\epsilon$ error in rounding LP packing of small jobs. An $\epsilon$ error can be chosen to be ⅓ of amount to result in a $(1+\epsilon)$ approximation.

Figure 5:
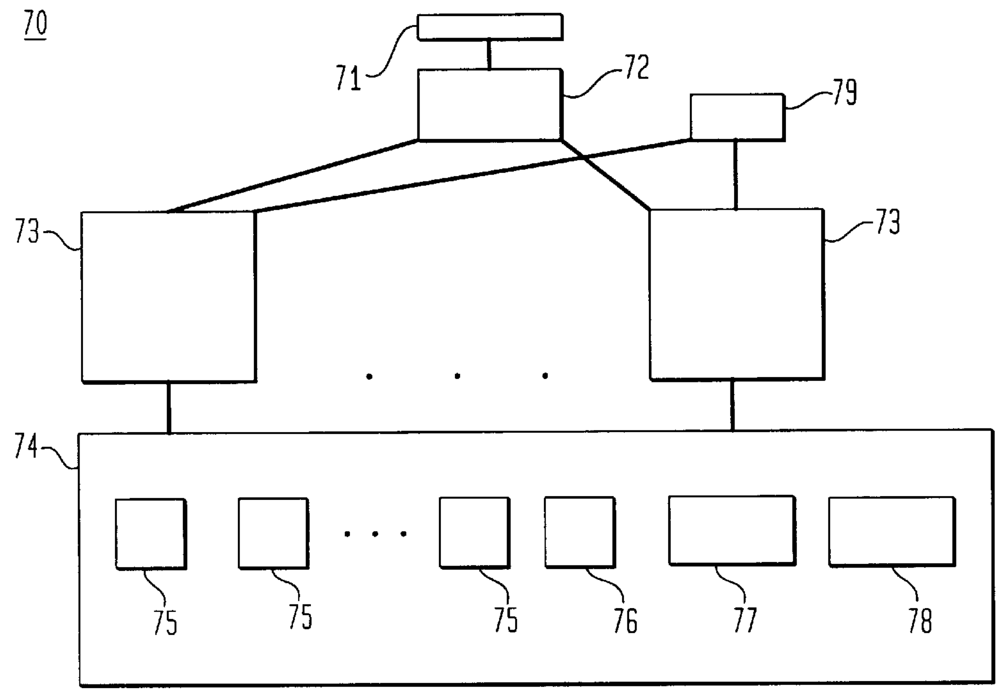
FIG. 5 is a block diagram of a system embodying features of the present invention.

FIG. 5 is a block diagram of a system for load sharing multi-dimensional jobs among multiple multiprocessors 60. Schedule processor 62 implements the above described method for load sharing multi-dimensional jobs among multiple multiprocessors 10. Schedule processor 62 is a processor running Windows or MS-DOS operating systems. Those skilled in the art will recognize that the schedule processor can be any type of processor.

User interface 61 provides error criteria, $\epsilon$, to schedule processor 60. Multiprocessors 63 communicate with schedule processor 62 to provide information on the number of multiprocessors, m, number of tasks, n, and number of dimensions, d, to be scheduled for each multiprocessor 63. Schedule processor 62 determines the d-dimensional vectors from the multiprocessor information. Multiprocessors 63 share time shareable resources 64. In this embodiment, time shareable resources 64 include direct access storage devices 65, modem 66, network controller 67 and central processing unit 68. It will be appreciated that different configurations of time shareable resources can be present in alternate embodiments of the invention. Schedule processor 62 establishes a schedule for multiprocessors 63 providing an approximate value with $(1+\epsilon)$ of optimal. Memory 69 stores the established schedule and communicates the established schedule to microprocessors 63.

It is to be understood that the above-described embodiments are illustrative of only a few of the many possible specific embodiments which can represent applications of the principles of the inventions. Numerous and varied other arrangements can be readily devised in accordance with these principles by those skilled in the art without departing from the spirit and scope of the invention.

What is claimed:

1. A method of scheduling a plurality of multi-dimensional tasks on a plurality of processors for load sharing among said plurality of processors to within an error criteria, $\epsilon$, in which each processor is represented by a multi-dimensional bin, comprising the steps of:

a. guessing a value of optimal load among said plurality of processors;

b. partitioning the plurality of multi-dimensional tasks into a set of large tasks and a set of small tasks;

c. guessing an interaction of the set of large tasks and of the set of small tasks to determine a configuration of multi-dimensional bins;

d. discretizing the set of large tasks into a set of discretized large tasks;

e. packing the discretized set of large tasks in the guessed interaction;

f. determining if the set of small tasks can be allocated into space of the multi-dimensional bins unallocated after step (e); and g. establishing if step (f) is valid, thereby determining a schedule of the multi-dimensional tasks from the bin configuration of the set of discretized tasks and the bin configuration of the set of small tasks which has a maximum load less than $(1+\epsilon)$ times the optimal load; otherwise h. iteratively repeating the steps (a)–(f) if step f is not valid until the step (f) is valid.

2. The method of claim 1 wherein if the step (h) is executed further comprising the step of:

increasing the guessed value of optimal load by a factor of$(1+\epsilon)$for each iteration of the steps (a)–(f).

3. The method of claim 1 wherein the step (b) of partitioning includes the steps of:

determining if a largest dimension is smaller than the error criteria per number of dimensions represented by $\delta$; and determining a set of large vectors if the error criteria per number of dimensions, $\delta$, is smaller than said largest coordinate; otherwise determining a set of small vectors if the error criteria per number of dimensions, $\delta$, is greater than or equal to said largest coordinate.

4. The method of claim 1 wherein the plurality of multi-dimensional tasks is represented by a d-dimensional vector, $p_j$, and an error criteria per number of dimensions is represented by $\delta$, wherein the step (f) of determining includes the steps of:

i. defining an integer program to actually pack the d-dimensional vectors representing the small tasks in the space of the plurality of multi-dimensional bins unallocated after step (e);

j. solving the integer program by linear relaxation with a vertex solution to determine from the vertex solution d-dimensional vectors representing the small tasks which can be allocated integrally to one of the plurality of multi-dimensional bins and ddimensional vectors representing the small tasks which can be allocated fractionally; and k. if step (j) is valid, packing the d-dimensional vectors representing the small tasks determined to be allocated fractionally in a round robin greedy fashion to one of the plurality of multi-dimensional bins; or l. if step (j) is not valid reporting failure.

5. The method of claim 3 wherein the step (d) of discretizing includes the steps of:

rounding dimensions of the set of large vectors which are smaller than $\delta^2$ to zero for determining a smallest non zero coordinate from the set of large vectors;

partitioning the set of large vectors into geometrically increasing intervals; and rounding up non zero coordinates of each large vector in the set of large vectors up to the right end part of one the intervals of which the coordinate falls to form the discretized large tasks.

6. The method of claim 5 wherein the intervals are determined as $\log_{1+\epsilon}1/\delta^2$ intervals from $\delta^2$ to 1.

7. The method of claim 6, wherein the step (e) of packing includes the steps of:

defining a number of the large vectors to fit in each of the plurality of multidimensional bins;

defining a number of types of the large vectors;

assigning a capacity configuration for each of the plurality of multi-dimensional bins from the space of the plurality of multi-dimensional bins unallocated in step (c); and determining a plurality of subsets of the large vectors to fit in the assigned capacity configuration for each of the plurality of multi-dimensional bins by dynamic programming.

8. The method of claim 7 wherein the number of discretized large vectors to fit in any of said plurality of multi-dimensional bins is represented by:

$$d^2/\epsilon$$

wherein d is the number of dimensions.

9. The method of claim 8 wherein the number of types of the large vectors is represented by:

$$(\log_{1+\epsilon}1/\delta^2)^d.$$

10. A system for scheduling a plurality of multi-dimensional tasks on a plurality of processors to provide a maximum load among the processors within an error criteria, $\epsilon$, comprising:

the plurality of processors;

a process scheduler;

memory for storing a schedule of the plurality of multi-dimensional tasks for said process scheduler;

said process scheduler adapted to establish a schedule of said multi-dimensional tasks, said process scheduler comprising:

means for representing the processors as m multi-dimensional bins;

first guessing means for guessing a value of an optimal load among the plurality of processors;

partitioning means for partitioning the plurality of multi-dimensional tasks into a set of large tasks and a set of small tasks;

second guessing means for guessing an interaction of the set of large tasks and the set of small tasks;

discretizing means for discretizing said set of large tasks into a set of discretized large tasks;

packing means for packing the discretized set of large tasks in the guessed interaction;

determining means for determining if the set of small tasks can be allocated into space of the plurality of multi-dimensional bins unallocated by the packing means, wherein said guessing means, said partitioning means, said second guessing means, said discretizing means, said packing means and said determining means are repeatedly accessed until said small tasks can be allocated.

11. The system of claim 10 wherein the guessing means further includes:

means for increasing the guessed value for said value of optimal load by a factor of (1+$\epsilon$) each time said first guessing means is accessed.

12. The system of claim 10 wherein said partitioning means further comprises:

means for determining if a largest dimension is smaller than said error criteria per number of dimensions represented by $\delta$;

means for determining a set of large vectors if the error criteria per number of dimensions, $\delta$ is smaller than said largest coordinate; and means for determining a set of small vectors if the error criteria per number of dimensions, $\delta$, is greater than or equal to said largest coordinate.

13. The system of claim 12 wherein said discretizing means includes:

means for rounding dimensions of the set of large vectors which are smaller than $\delta^2$ to zero for determining a smallest non zero coordinate from said set of large vectors;

means for partitioning said set of large vectors into geometrically increasing intervals; and means for rounding up mapping non zero coordinates of each large vector in the set of large vectors up to the right end part of one of the intervals of which the coordinate falls to form the discretized large tasks.

14. The system of claim 12 wherein the plurality of multi-dimensional tasks is represented by a d-dimensional vector, $p_j$, and an error criteria per number of dimensions is represented by $\delta$, wherein said determining means includes:

means for defining an integer program to allocate d-dimensional vectors representing the small tasks in the space of the m multi-dimensional bins unallocated after allocating the set of discretized tasks;

means for solving the integer program by linear relaxation to determine from the vertex solution d-dimensional vectors representing the small tasks which can be allocated integrally to one of the m multi-dimensional bins and d-dimensional vectors representing the small tasks which can be allocated fractionally; and means for packing the d-dimensional vectors representing the small tasks determined to be allocated fractionally in a round robin greedy fashion to one of said plurality of multi-dimensional bins.

15. The system of claim 13 wherein the packing means includes:

means for defining a number of the large vectors to fit in each of the m multidimensional bins;

means for defining a number of types of the large vectors;

means for assigning a capacity configuration for each of the m multi-dimensional bins from said space of the m multi-dimensional bins unallocated by the guessed allocation of the set of small tasks; and means for determining a plurality of subsets of the large vectors to fit in the assigned capacity configuration for each of the plurality of multi-dimensional bins by dynamic programming.

* * * * *